Patented Oct. 31, 1922.

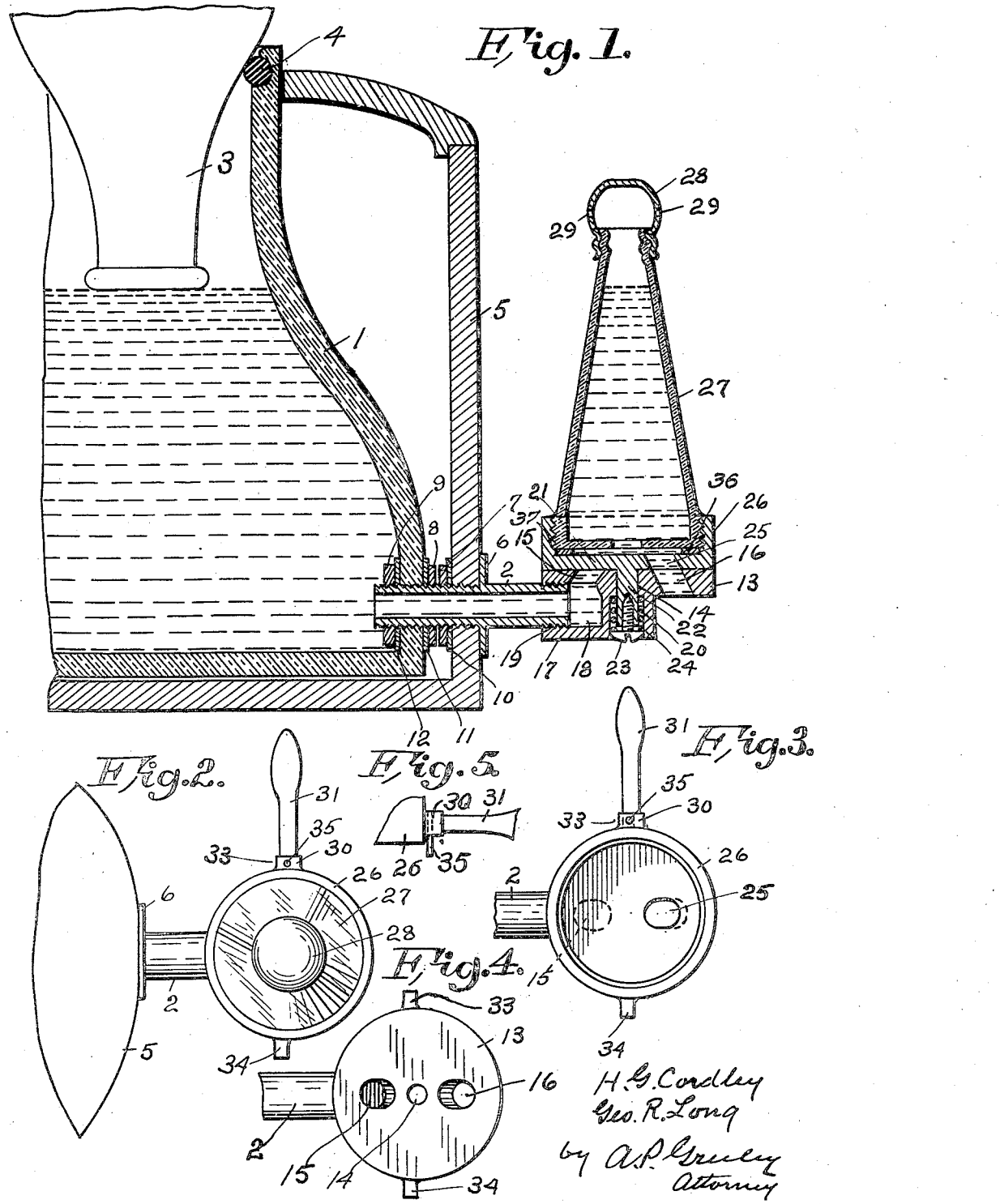

1,433,939

UNITED STATES PATENT OFFICE.

HENRY G. CORDLEY, OF GLEN RIDGE, NEW JERSEY, AND GEORGE R. LONG, OF WATERBURY, CONNECTICUT.

MEASURING AND DISPLAY DISPENSING DEVICE.

Application filed June 16, 1921. Serial No. 477,944.

*To all whom it may concern:*

Be it known that we, HENRY G. CORDLEY and GEORGE R. LONG, citizens of the United States, residing, respectively, at Glen Ridge, in the county of Essex and State of New Jersey, and at Waterbury, in the county of New Haven and State of Connecticut, have invented certain new and useful Improvements in Measuring and Display Dispensing Devices, of which the following is a description, reference being had to the accompanying drawings, forming a part hereof.

Our invention relates to liquid dispensing devices particularly adapted for dispensing beverages and has for its object to provide a device for this purpose which will be simple and inexpensive in construction, will be adapted to deliver an accurately measured quantity of the liquid, will be adapted to serve as a display device to indicate the character of the liquid which is to be dispensed and will be adapted to remain with the measuring and display receptacle filled to the desired extent with liquid as long as may be desired without attention.

With the above described objects and other objects hereinafter explained in view, our invention consists in the construction and combination of elements hereinafter described and claimed.

Referring to the drawings;

Figure 1 is a vertical central sectional view of a complete dispensing device embodying our invention.

Figure 2 is a fragmentary top plan view of the device shown in Figure 1.

Figure 3 is a top plan view of the rotating disk which carries the measuring and display receptacle, this receptacle being removed.

Figure 4 is a top plan view of the base of the measuring and display device, and Figure 5 is a fragmentary side view showing the base of the operating handle and the stop pin.

In the drawings 1 indicates a container having an opening near its bottom for an outlet tube 2 and having its upper end open and adapted to receive the neck of an inverted bottle 3 the shoulder of which rests on a gasket 4 in the open upper end of the container and is supported by the container. The container is here shown as enclosed in a tank 5 adapted to contain ice about the container and having near its bottom an opening for the outlet tube 2 in line with the opening for this outlet tube in the container 1.

If it is not desired to cool the liquid, or to cool it by other means than by surrounding it with ice, the tank 5 may be dispensed with.

The outlet tube 2 has secured thereon a disk 6 adapted to bear against the outside of the wall of the tank 5 and the tube is screwthreaded on its inner portion to receive nuts 7, 8 and 9, the nut 7 bearing against the inside of the wall of the tank through the usual compressible washer 10, and the nuts 8 and 9 bear respectively against the outside and inside of the wall of the container 1 through the usual compressible washers 11 and 12. The outlet tube 2 is also screwthreaded at its outer end to receive the base 13 of the measuring and display device.

The base 13 is preferably formed in one piece, as by casting, with a flat upper face, preferably circular, having formed therein a central opening 14, an inlet opening 15 and an outlet opening 16, the inlet and outlet openings being preferably inclined outward from their upper to their lower ends. On its under side, to one side of the centre, the base 13 is provided with a projection 17 having formed therein at right angles with the axis of the base, an opening 18 communicating with the lower end of the inlet opening 15 and screwthreaded at 19 to receive the screwthreaded outer end of the outlet tube 2. Extending into the projection 17 from below, concentric with the central opening 14 is a cylindrical recess 20.

On the upper face of the base 13 rests a disk 21 having at its centre a downwardly extending cylindrical rod 22 preferably in one piece with the disk, adapted to fit and rotate in the central opening 14 of the base. Extending into this rod 22 from below is a screwthreaded opening adapted to receive a headed screw 23. Surrounding the rod 22 and bearing at its upper end against the end of the recess 20 and, at its other end against the head of the screw 23, is a coiled expanding spring 24. The tension of this spring 24, which may be varied by tightening or loosening the screw, serves to keep the under face of the disk 21 in close contact with the upper face of the base 13 so as to prevent leakage between them.

In the disk 21 is formed an opening 25, preferably inclined as shown, adapted to register with either the inlet opening 15 or the outlet opening 16 of the base.

The disk 21 is provided with an upwardly extending circumferential wall 26 which is internally screwthreaded to receive the base of the measuring and display receptacle 27. This measuring and display receptacle is formed of transparent material, preferably clear glass, and is conical in shape tapering from a relatively large base to a relatively small top. At its top it is provided with a cap 28 having one or more openings 29 in it. This measuring and display receptacle is of such length from bottom to top that its upper end, when it is in position, will be above the plane of the mouth of the inverted bottle 3 so that, as the level of the liquid in the container cannot extend above the height necessary to seal the bottle mouth, the liquid in the measuring and display receptacle cannot run out of its upper end.

The disk 21 is provided on its side with a socket 30 to receive a handle 31 for rotating it to bring the opening 25 into register with the inlet or outlet opening of the base 13 and its movement of rotation is limited by pins 33 and 34 on the side of the base 13 in the path of movement of a downwardly extending pin 35 carried by the socket 30, this pin also serving to retain the end of the handle in the socket.

The base of the measuring and display receptacle has a central opening 36 and, in order to permit liquid to flow into and out of this receptacle, its base is held away from the upper face of the disk by a ring 37 of rubber or other compressible material which serves also to prevent leakage between the receptacle and the disk.

In use, the handle 31 being swung to the left until the pin 35 comes in contact with the pin 34, the opening 25 will be in register with the inlet opening 15 and liquid will flow into the receptacle 27 from the container through the outlet tube 2. If the handle is left in this position the liquid will flow into the receptacle until it reaches the level of the liquid in the container but, owing to the decreasing diameter of the receptacle toward its upper end, the amount of liquid flowing into the receptacle as it approaches the level of the liquid in the container will decrease as the height of the liquid increases. If less than the full amount of liquid is desired, the handle 31 may be moved to the right whenever the liquid reaches the predetermined height in the receptacle, moving the opening 25 out of register with the inlet opening and cutting off the flow. By reason of the taper of the receptacle the measurement may be made more accurately than if the receptacle were of large diameter throughout as a difference in height above or below a predetermined point makes less difference in the narrower portion of the receptacle than at its base. When it is desired to deliver the measured liquid into a glass or other receptacle, the glass or other receptacle is placed below the outlet opening 16 and the handle 31 is swung around to the right until the pin 35 is in contact with the pin 33 which will bring the opening 25 in register with the outlet opening 16 and the measured liquid will flow out.

The container 1 is usually of porcelain or other opaque material and even if the tank 5 is not used the liquid in the container cannot be seen. By drawing a quantity of the liquid into the receptacle 27, which should be of clear glass, the character of the liquid can be seen before it is delivered into the glass from which it is to be drank, thus displaying the liquid.

Having thus described our invention what we claim is:

1. In a dispensing device for liquids, the combination with a liquid container of opaque material and means for maintaining liquid therein at a constant level, of a horizontal plate having inlet and outlet openings formed therein, arranged above the level of the bottom of the container and having its inlet opening in communication with the container, a disk mounted to rotate on the horizontal plate having an opening therein adapted to register with the inlet opening and the outlet opening in the horizontal plate, and a display receptacle of transparent material carried by said disk having an opening in its bottom and an open vent at its upper end and having a definite capacity, the upper end of said display receptacle extending above the level of the liquid in the container.

2. In a dispensing device for liquids, the combination with a liquid container and means for maintaining liquid therein at a constant level, of a horizontal plate having inlet and outlet openings formed therein, arranged above the level of the bottom of the container and having its inlet opening in communication with the container, a disk mounted to rotate on the horizontal plate having an opening therein adapted to register with the inlet opening and the outlet opening in the plate, of a display receptacle of transparent material carried by the disk having an opening in its bottom and an open vent at its upper end and tapering from a relatively large diameter at its lower end to a relatively small diameter at its upper end, the upper end of said display receptacle extending above the level of the liquid in the container.

In testimony whereof we affix our signatures this 8th day of June, 1921.

HENRY G. CORDLEY.
GEORGE R. LONG.